(12) United States Patent
Shelton et al.

(10) Patent No.: US 7,845,889 B2
(45) Date of Patent: Dec. 7, 2010

(54) GROOVED FASTENER

(75) Inventors: Lawrence S. Shelton, Morton Grove, IL (US); Henry W. Schniedermeier, Evanston, IL (US)

(73) Assignee: Illinois Tool Works Inc., Glenview, IL (US)

( * ) Notice: Subject to any disclaimer, the term of this patent is extended or adjusted under 35 U.S.C. 154(b) by 71 days.

(21) Appl. No.: 11/958,670

(22) Filed: Dec. 18, 2007

(65) Prior Publication Data

US 2008/0193257 A1    Aug. 14, 2008

Related U.S. Application Data

(60) Provisional application No. 60/889,622, filed on Feb. 13, 2007.

(51) Int. Cl.
*F16B 15/00* (2006.01)

(52) U.S. Cl. .................... 411/451.4; 411/452

(58) Field of Classification Search .............. 411/451.4, 411/452
See application file for complete search history.

(56) References Cited

U.S. PATENT DOCUMENTS

| | | | | |
|---|---|---|---|---|
| 276,541 | A | * | 4/1883 | Sloan ................ 411/453 |
| 340,692 | A | | 4/1886 | Bailey |
| 456,723 | A | * | 7/1891 | Harvey ............... 411/452 |
| 1,649,049 | A | * | 11/1927 | Williams et al. ....... 411/454 |
| 2,356,376 | A | * | 8/1944 | Brown, Jr. ........... 411/451.4 |
| 4,637,768 | A | * | 1/1987 | Rabe ................. 411/452 |
| 4,755,091 | A | | 7/1988 | Potucek et al. |
| 4,800,746 | A | | 1/1989 | Potucek |
| 4,815,910 | A | | 3/1989 | Potucek |
| 4,973,211 | A | * | 11/1990 | Potucek .............. 411/452 |
| 5,143,501 | A | | 9/1992 | Leistner et al. |

(Continued)

FOREIGN PATENT DOCUMENTS

EP    0076244    4/1983

(Continued)

OTHER PUBLICATIONS

International Search Report dated May 30, 2008 for PCT/US2008/053063.

*Primary Examiner*—Gary Estremsky
(74) *Attorney, Agent, or Firm*—Levenfeld Pearlstein, LLC

(57) ABSTRACT

A nail having a plurality of grooves configured to reduce the amount of material needed to create the nail and increase the holding power of the nail, while only minimally affecting the bending yield strength of the nail and other important properties. The nail includes a relatively high number of grooves having a relatively shallow depth to retain a cross-sectional geometry of the shank that permits the formation of a full round head of sufficiently large diameter such that pull through resistance of the nail is not significantly affected. Various embodiments of such a nail are disclosed. In a first embodiment, the grooves are semi-circular and are disposed evenly and symmetrically about the circumference of the shank. In a second embodiment, a protrusion is formed at one tangent point (corner) of each of the plurality of grooves. In a third embodiment, a protrusion is formed at each tangent point of each of the plurality of grooves. In other embodiments the grooves may be unevenly and asymmetrically disposed about the circumference of the shank, the grooves may comprise non-semi-circular geometries and the grooves may comprise deformations.

7 Claims, 4 Drawing Sheets

U.S. PATENT DOCUMENTS

| | | | |
|---|---|---|---|
| 5,391,029 A * | 2/1995 | Fardell | 411/452 |
| 5,542,886 A | 8/1996 | Scott et al. | |
| 5,688,077 A * | 11/1997 | Kynoch | 405/259.5 |
| 5,741,104 A | 4/1998 | Lat et al. | |
| 5,867,958 A * | 2/1999 | Ditka et al. | 52/410 |
| 6,758,018 B2 | 7/2004 | Sutt, Jr. | |
| 2001/0014262 A1* | 8/2001 | Friederich et al. | 411/386 |
| 2004/0136811 A1* | 7/2004 | Tarlton | 411/451.4 |
| 2007/0160442 A1 | 7/2007 | Reynolds | |

FOREIGN PATENT DOCUMENTS

| | | |
|---|---|---|
| EP | 0576034 | 12/1993 |
| FR | 2418369 | 9/1979 |
| GB | 1339543 | 12/1973 |
| JP | S46-3384 A | 6/1971 |
| JP | 2004144121 | 5/2004 |

* cited by examiner

GROOVED FASTENER

BACKGROUND OF THE INVENTION

This invention pertains to fasteners. More particularly, the invention pertains to a nail with a shank having a plurality of grooves configured to reduce the amount of material needed to create the nail and increase the holding power of the nail, while only minimally affecting the bending yield strength of the nail and other important properties of the nail.

Round nails (nails having cylindrical shanks) have been produced for hundreds of years. Not only are round nails the easiest type of nail to manufacture, because of their symmetrical shape round nails exhibit predictable, uniform properties in any direction when driven into wood, their largest application. Such properties include holding power and bending yield strength.

Holding power, or withdrawal strength, refers to the nail's resistance to an axial force (a load parallel to the nail shank). Holding power includes not only the nail's resistance to withdrawing from the substrate into which it is driven, but also to the nail's resistance to "pull through." Pull through occurs when the head of the nail is pulled through the structural element being attached to the substrate. Bending yield strength refers to the nail's resistance to bending (a load perpendicular to the nail shank).

Most round nails are manufactured from steel. It has been estimated that more than 70-80% of the total cost to manufacture a nail comes from the raw material used to make the nail. As the cost of steel and other raw materials used to manufacture nails continues to rise, it would be desirable to minimize the manufacturing cost by creating a nail that uses less material without significantly adversely affecting the desirable physical properties of the nail, such as holding power and bending yield strength. Additionally, it would be desirable that such reduction in material does not affect the head geometry of the nail, such that a full round head may be used in order to maintain a sufficiently high pull through resistance.

The prior art has altered the shape of the nail shank in order to increase holding power. For example, U.S. Pat. No. 5,143,501 for a "Grooved Nail and Strip" by Leistner et al. discloses a nail having a shank formed with grooves formed along the shank. The shape and number of the grooves vary over several disclosed embodiments. Similarly, U.S. Pat. Nos. 4,755,091 and 4,815,910 by Potucek for a "Star Fastener" and a "Collated Nail Strip," respectively, disclose a nail with a star-shaped shank.

As discussed above, a nail with a full round head is desirable in order to provide increased pull through resistance. Moreover, a nail with an enlarged full round head provides even greater pull through resistance. Examples of such nails having enlarged round heads are disclosed in U.S. Pat. No. 5,741,104 by Lat et al. for a "Steel Fastener Having Grooved Shank" and U.S. Pat. No. 6,758,018 by Sutt, Jr. for "Power Driven Nails for Sheathing Having Enlarged Diameter Heads for Enhanced Retention and Method."

While the disclosed prior art shank designs seek to increase the holding power of the nail, such prior art nails do not have the same bending yield strength and other important properties in all directions as non-grooved nails. Moreover, because the prior art designs use a relatively small number of relatively large grooves that extend deeply into the shank, the shape and size of the head of such prior art nails may be limited. However, if the grooves formed in the shank extend too far into the body of the shank, the resulting shank geometry does not permit the nail to have a full round head, or a head of sufficient size to provide a desirably pull through resistance.

Accordingly, there exists a need for a nail configured to reduce the amount of material needed to create the nail while at the same time increasing holding power and only minimally affecting the bending yield strength of the nail. Desirably, such a nail includes a relatively large number of relatively shallow grooves disposed about the circumference of the shank. More desirably, formation of the grooves does not alter the geometry of the shank such that the nail cannot have a full round head. More desirably still, the grooves may be formed with deformations to increase the holding power of the nail. Most desirably, the grooves may be combined with protrusions extending outwardly from the shank in order to increase the moment of inertia of the nail, and to further increase the holding power and bending yield strength of the nail.

BRIEF SUMMARY OF THE INVENTION

The present invention pertains to a nail having a shank formed with a relatively large number of relatively shallow grooves configured to simultaneously reduce the amount of material needed to create the nail (as compared to a prior art nail having a non-grooved shank) while only minimally affecting the bending yield strength of the nail and other important properties of the nail. Moreover, the relatively high number of grooves combined with the relatively shallow depth of the grooves allows the formation of a desirable full round head of sufficiently large diameter such that pull through resistance is not significantly affected.

Preferably, the grooves are configured to extend along the longitudinal axis of the shank, from the head of the nail to the point. However, in some embodiments, the grooves may be interrupted and/or may not extend the entire distance from the head of the nail to the point.

Various embodiments of such a nail are disclosed. In the one embodiment, the grooves are semi-circular in shape, and an even number of the grooves are disposed symmetrically about the circumference of the shank. In a second embodiment, a protrusion is formed at one tangent point (corner) of each of the semi-circular grooves. In a third embodiment, a protrusion is formed at each tangent point of each of the semi-circular grooves. In both the second and third embodiments, such protrusions preferably are semi-circular in shape and extend outwardly from the shank.

Formation of the grooves in the nail causes an elongation of the nail, and a corresponding weight reduction in the nail, on the order of 6%, as compared to non-grooved prior art round nails. However, the bending yield strength of the nail is reduced by only about 3%, as compared to non-grooved prior art round nails.

Additionally, the grooves serve to increase the surface area of the shank, thereby increasing the contact area between the nail and the substrate into which the nail is driven as compared to non-grooved prior art round nails. Such increased contact area may result in increased withdrawal strength of the nail.

Moreover, the formation of the grooves in the shank creates a work hardening effect at the intersection between the outer diameter of the shank and the grooves. This localized work hardening effect advantageously increases the bending yield strength of the nail such that the reduction of material associated with forming the grooves does not significantly impact the overall bending yield strength of the nail as compared to non-grooved prior art round nails.

Similarly, the formation of the protrusions in the second and third embodiments of the present invention further increases the surface area of the shank (as compared to the nail of the first embodiment of the present invention), thereby additionally increasing the amount of contact area between the nail and the substrate into which the nail is driven. Increasing the contact area may result in a further increase in the withdrawal strength of the nail. Additionally, the formation of the protrusions moves material towards the outer extremities of the nail, thereby increasing the nail's moment of inertia and, consequently, the bending yield strength.

The formation of the protrusions in the shank also creates a further localized work hardening effect at the tangent points of the grooves, further increasing the bending yield strength of the nail. Additional increases in bending yield strength may be achieved by increasing the chemistry of the steel used to form the nail and/or heat treating the steel during formation of the nail.

In some embodiments, an odd number of grooves may be disposed asymmetrically about the circumference of the shank. In such embodiments, any bending or shear forces applied at right angles and central to a groove are resisted at the opposite side of the shank by a non-grooved section of the shank. Such resistance further increases the bending yield strength of the nail.

While semi-circular grooves are preferred because their geometry maximizes material removal from the shank as compared to many prior art groove designs, and desirably allows for use of a full round head, in some embodiments, the grooves may be formed using other geometries. For example, in one embodiment, the grooves may be formed in truncated prism geometry which further optimizes the reduction of material closer to the center of mass of the nail. In another embodiment the grooves may be formed in a V-shaped geometry.

Additionally, in some embodiments, the grooves may be formed with deformations to increase the withdrawal strength and bending yield strength of the nail. Such deformations may include threads, serrations, embedded plastic beads, or other types of deformations.

The grooved configurations provide for ease of driving the fasteners into the substrate. Coating can be applied to the fasteners to decrease the power required to drive the fasteners and to increase the holding power of the fasteners.

These and other features and advantages of the present invention will be apparent from the following detailed description and drawings in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
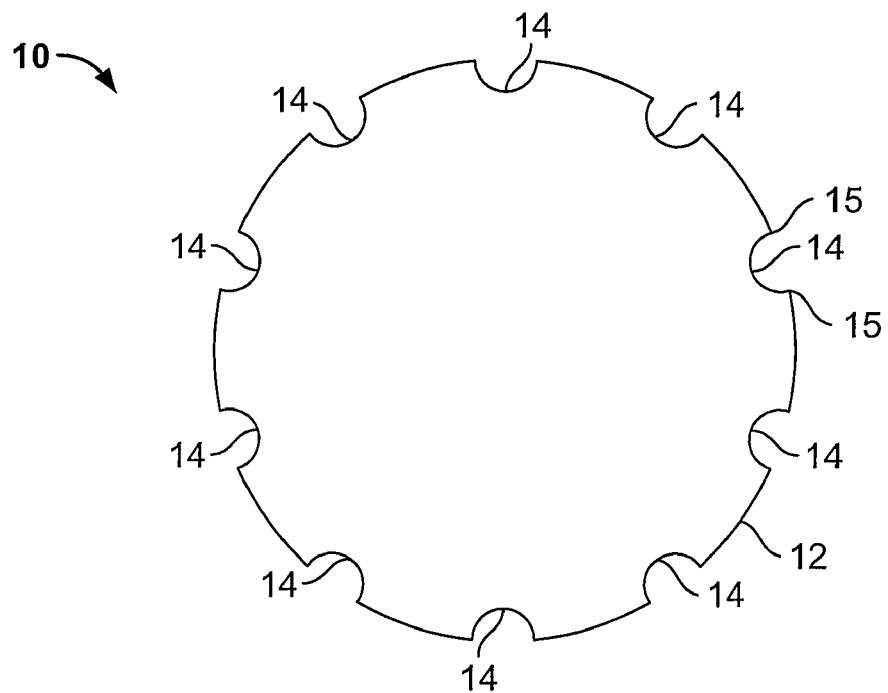
FIG. 1 is a cross-sectional view of the shank of the nail in the first embodiment of the present invention.

While the present invention is susceptible of embodiment in various forms, there is shown in the drawings and will hereinafter be described several preferred embodiments with the understanding that the present disclosure is to be considered an exemplification of the invention and is not intended to limit the invention to the specific embodiments illustrated.

It should be further understood that the title of this section of the specification, namely, "Detailed Description of the Invention," relates to a requirement of the United States Patent Office, and does not imply, nor should be inferred to limit the subject matter disclosed herein.

The present invention pertains to a nail having a shank formed with a relatively large number of relatively shallow grooves configured to simultaneously reduce the amount of material needed to create the nail (as compared to non-grooved prior art nails) and that may increase the holding power of the nail, while only minimally affecting the bending yield strength of the nail and other important properties of the nail. Moreover, the relatively high number of grooves combined with the relatively shallow depth of the grooves allows the formation of a desirable full round head of sufficiently large diameter such that pull through resistance of the nail is not significantly affected. Further, it has been observed that the grooved configurations provide for ease of driving the fasteners into the substrate. This is particularly significant when cordless tools are used, and even when air (pneumatic) tools are used in that this correlates to less power that is needed to drive the fastener into the substrate. This can perhaps permit the use of smaller tools, or the ability to drive a larger number of fasteners on a single charge for cordless battery powered tools.

Figure 4:
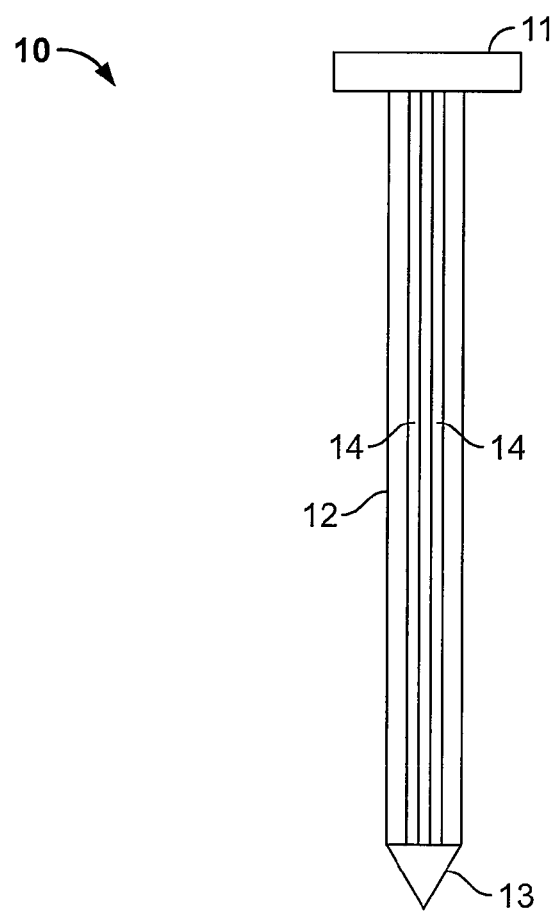
FIG. 4 is a side view of the nail of FIG. 1.

As shown in FIG. 4, nail 10 in a first embodiment of the present invention includes a head 11, an elongated shank 12 and a point 13. Head 11 preferably is round and may be centered over shank 12 (as shown) or offset (not shown). However, it will be appreciated that head 11 may be formed in other shapes and geometries.

Shank 12 is generally cylindrical and extends downwardly from head 11 to point 13. Point 13 is formed at the bottom of nail 10 and comprises a generally pointed tip configured to ease entry of nail 10 into a substrate, such as wood. Such a nail construction is well known to those skilled in the art. It will be appreciated that the general nail design as shown in FIG. 4 is the basis for each embodiment of the nail of the present invention.

As shown in FIGS. 1 and 4, nail 10 of the first embodiment of the present invention is configured with a plurality of grooves 14. Preferably, grooves 14 are configured to extend longitudinally along the longitudinal axis of shank 12, from head 11 to point 13 of nail 10. However, it will be appreciated that in some embodiments of nail 10, grooves 14 may be interrupted and/or may not extend along the entire distance of shank 12 from head 11 of to point 13.

Figure 7:
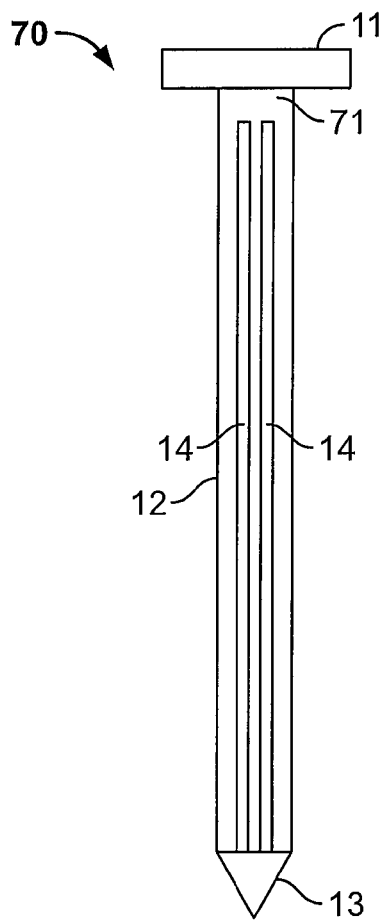
FIG. 7 is a side view of the nail of FIG. 1 in an alternate embodiment.

For example, in one alternate embodiment as shown in FIG. 7, grooves 14 may be formed such that grooves 14 do not extend along shank 12 the entire distance to head 11 of nail

70. In this embodiment, the upper portion 71 of shank 12 directly beneath head 11 is not grooved.

Unlike prior art nail designs that incorporate a relatively small number of relatively large grooves that extend deeply into the shank, nail 10 of the present invention incorporates a relatively high number of relatively shallow grooves 14 that do not extend deeply into shank 12.

Grooves 14 are configured to remove a sufficient amount of material from the nail to create a significant weight reduction (on the order of 6%, and perhaps as high as 10%), but not so much material that a desirable shape and size of head 11 cannot be retained. That is, the configuration of grooves 14 permits shank 12 to maintain a cross-sectional geometry sufficient to support head 10 having a desirable full round shape of sufficiently large diameter that the pull through resistance of nail 10 is not significantly affected. However, it will be appreciated that the cross-sectional geometry of shank 12 may also support a head having other shapes and geometries.

As shown in FIG. 1, grooves 14 in the first embodiment are fully semi-circular in shape (that is, each groove 14 comprises a 180 degree semi-circle, as compared to some prior art groove designs that consist of arcuate geometries of less than 180 degrees). A semi-circular geometry for grooves 14 is preferred because such geometry maximizes material removal from shank 12 as compared to prior art nail designs, and desirably allows for use of a full round head by maintaining a sufficient cross-sectional geometry of shank 12 to support such a head. As discussed above, a full round head is advantageous because it provides for high pull through resistance (but it will be appreciated that other head shapes and geometries may be used). By minimizing the number of grooves, and by keeping the depth of the grooves shallow, the nail may desirably incorporate a full round head. It has been found that six or more grooves can provide a substantially fully rounded head.

Figure 5:
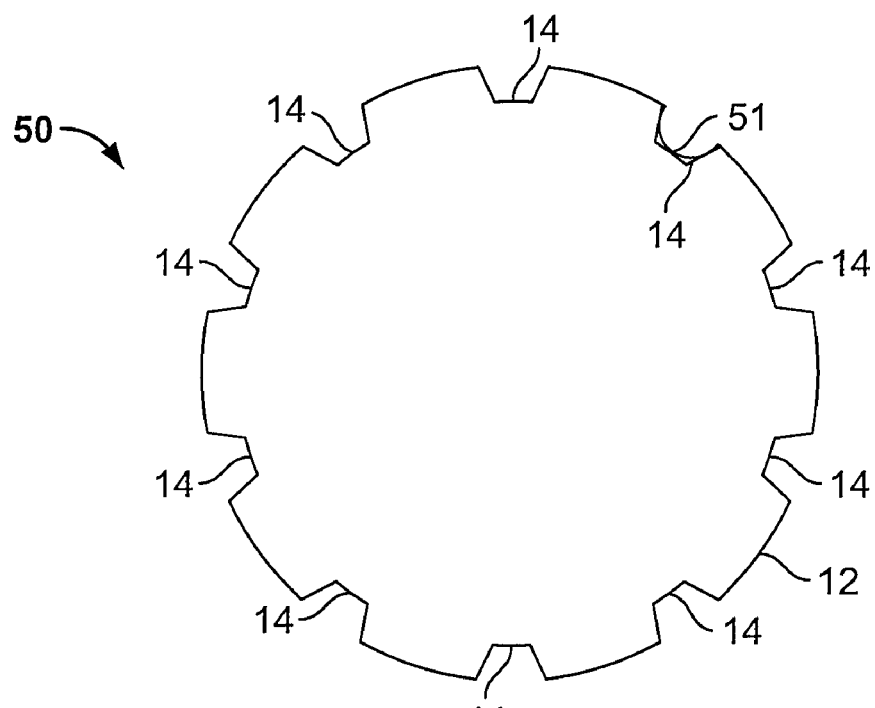
FIG. 5 is a cross-sectional view of the shank of the nail in an alternate embodiment of the present invention.

However, in some embodiments of the present invention, it may be advantageous to use other, non-semi-circular groove geometries, such as various "notched" grooves. For example, as shown in FIG. 5, in an alternate embodiment of the present invention, nail 50 includes a plurality of grooves 14 formed in a truncated prism geometry. Such a geometry further optimizes the reduction of material closer to the center of mass of nail 50. By way of comparison, FIG. 5 shows grooves 14 relative the location of an exemplary semi-circular groove 51 according to the first embodiment of the present invention. As can be seen, the formation of grooves 14 in this alternate embodiment of the present invention results in a similar reduction in material and weight as compared to semi-circular grooves.

Figure 6:
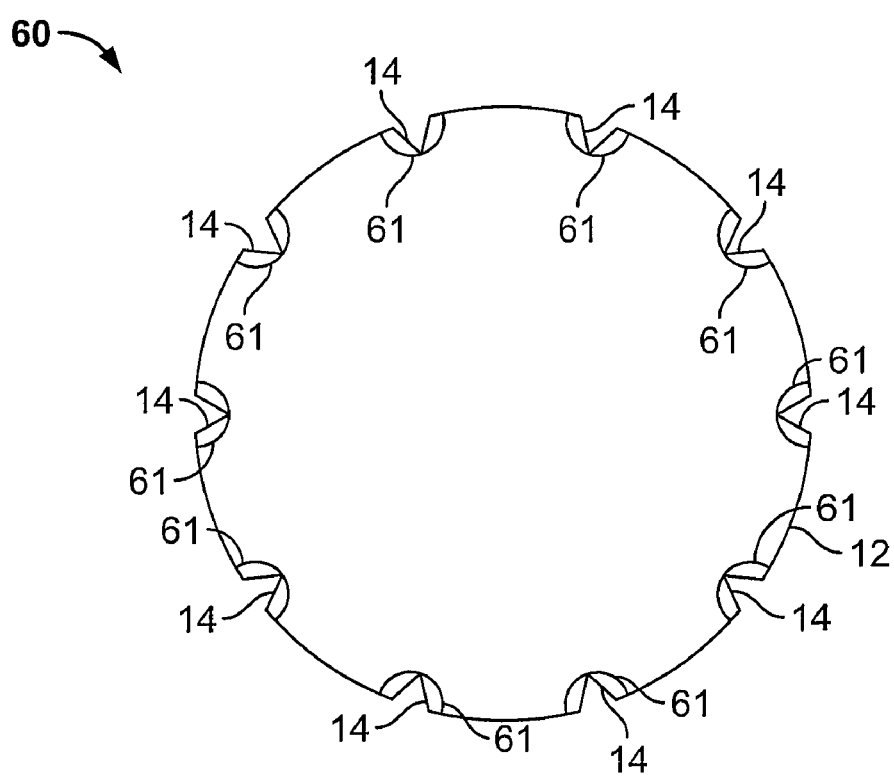
FIG. 6 is a cross-sectional view of the shank of the nail in an alternate embodiment of the present invention.

In another alternate embodiment of the present invention, as shown in FIG. 6, nail 60 includes a plurality of grooves 14 formed in a V-shaped geometry. By way of comparison, FIG. 6 shows grooves 14 relative the location of semi-circular grooves 61 according to the first embodiment of the present invention. As can be seen, the formation of grooves 14 in this alternate embodiment of the present invention results in substantially less reduction in material and weight as compared to semi-circular grooves.

As shown in FIG. 4, an even number (ten, in the exemplary embodiment) of grooves 14 may be disposed evenly and symmetrically about the circumference of shank 12. Such a configuration provides for uniform nail properties in all directions.

Figure 8:
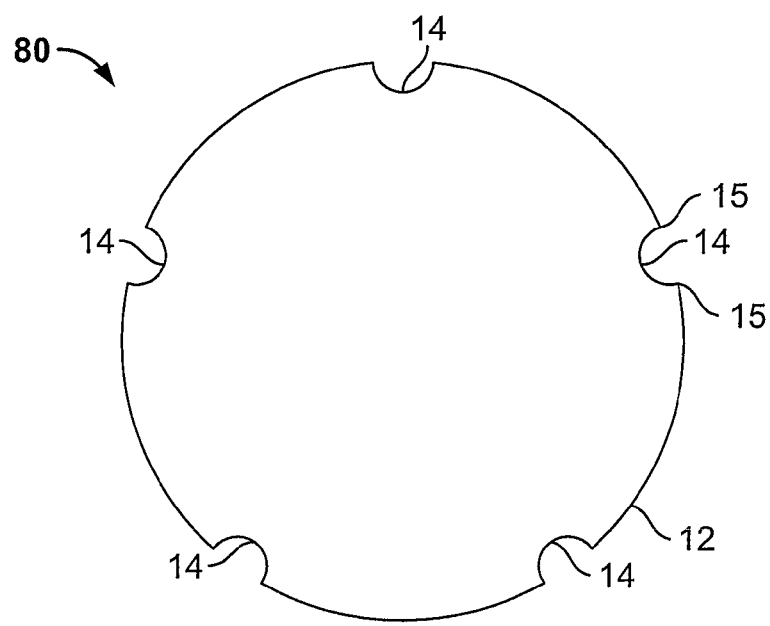
FIG. 8 is a cross-sectional view of the shank of the nail in an alternate embodiment of the present invention; and, FIG. 9 is an enlarged, partial side view of the nail in an alternate embodiment of the present invention showing grooves having deformations.

However, it will be appreciated that in some embodiments of nail 10, it may be preferable to dispose an odd number of grooves 14 asymmetrically about the circumference of shank 12. For example, as shown in FIG. 8, nail 80 may be formed with an odd number (five, in this exemplary embodiment) of grooves disposed asymmetrically about shank 12. In this embodiment, the diameter of shank 12 at the location of each groove 14 is never reduced by more than the depth of any single groove 14.

Moreover, any bending or shear forces applied normal and central to a particular groove 14 are resisted at the opposite side of shank 12 by a non-grooved section of shank 12. Such resistance may desirably increase the bending yield strength of nail 10. It will be appreciated that in this odd-number groove embodiment, each of the grooves has a nadir (the lowest point in the groove) and the nadirs are not diametrically opposed to one another. The prevents inadvertently over-thinning the nail shank and also improves the bending yield and shear strength.

In an exemplary embodiment of nail 10 in the first embodiment of the present invention, as shown in FIGS. 1 and 4, the diameter of shank 12 of nail 10 is 0.129 inches, a common nail size. In this exemplary embodiment, a total of ten grooves 14 are disposed about the circumference of shank 12, and each groove 14 has a radius (depth) of 0.007 inches and a diameter (width) of 0.014 inches. Grooves 14 are disposed evenly and symmetrically about the circumference of shank 12, and are separated from one another by a distance of 0.0263 inches. Consistent with the goal of the present invention, the use of a relatively high (ten) number of relatively shallow (0.007 inches) grooves maintains the geometry of shank 12 such that a full round head of sufficiently large diameter may be formed on nail 10. The other advantage of a multitude of grooves is that it provides many sites for work hardening causing improvement in strength, particularly as the chemistry of the nail is increased.

It should be noted that the preceding embodiment is one of many possible embodiments, and is presented by way of example only. It will be appreciated that in other embodiments of the present invention, the number of grooves 14, the depth and diameter of grooves 14 and distance between grooves 14 may vary depending upon the diameter of shank 12, the desired material and weight savings and the desired physical characteristics of nail 10, such as the desired withdrawal strength and bending yield strength.

By way of example only, it is envisioned that the number of grooves 14 may vary from about 4 to about 16 for a nail with a shank diameter of 0.129 inches. Again, it will be appreciated that aforementioned range of number of grooves may vary depending on the particular shank diameter of nail 10, and all such ranges are included within the scope of the present disclosure.

As discussed above, grooves 14 serve to increase the surface area of shank 12, thereby increasing the contact area between nail 10 and the substrate into which the nail 10 is driven (as compared to a nail having a non-grooved shank, for example). Such increased contact area may result in increased withdrawal strength of the nail. Moreover, the formation of grooves 14 in shank 12 creates a localized work hardening effect at the intersections between the outer diameter of shank 12 and grooves 14 (tangent points). Two exemplary tangent points 15 are identified in FIG. 1. It is, however, anticipated that increased withdrawal strength will be provided with a coating (e.g., adhesive) applied to the nail or in the grooves.

The localized work hardening effect at tangent points 15 advantageously increases the bending yield strength of nail 10 such that the reduction of material associated with forming grooves 14 does not significantly impact the overall bending yield strength of nail 10 as compared to a prior art nail having a non-grooved, round shank. Moreover, because grooves 14 are relatively small and shallow, the localized work hardening effect created by grooves 14 helps to maintain ductility to allow formation of a round head on the nail.

A sample nail was formed using low carbon steel using the principles of the first embodiment of the present invention. The sample nail was formed with a shank diameter of 0.129 inches. The sample nail included ten fully semi-circular grooves disposed about the circumference of shank. Each groove had a radius of 0.007 inches and a diameter (width) of 0.014 inches. The grooves were disposed evenly and symmetrically about the circumference of the shank, and were separated from one another by a distance of 0.0263 inches. The sample nail was tested and analyzed against a standard prior art nail having a round shank with no grooves and a diameter of 0.129 inches.

The formation of the grooves in the sample nail reduced the weight of the sample nail by 6% as compared to the weight of the prior art nail with no grooves. For sake of comparison, a V-shaped groove of similar depth only reduces the weight of the nail by less than 1% to less than 3%, depending upon the angle of the groove. Thus, the use of a semi-circular grove provides a significant increase in weight reduction as compared to a V-shaped groove.

Even though the sample nail weighed 6% less than the non-grooved prior art nail, the bending yield strength of the sample nail was reduced by only 3% as compared to the bending yield strength of the prior art nail. The significant decrease in the weight of the sample nail compensates for the relatively minor decrease in the bending yield strength. It is envisioned that the bending yield strength of the sample nail may be increased to a level even closer, or higher, to that of the prior art round nail by adjusting the chemistry of the steel used to form the nail and/or heat treating the steel during formation of the nail.

In some embodiments of the nail of the present invention, grooves 14 may be formed with deformations to further increase the withdrawal strength and bending yield strength of the nail. Such deformations may include threads, serrations, embedded plastic beads or other types of deformations that form a non-smooth surface within grooves 14. However, the deformations should be sufficiently small as to achieve a high yield strength. An exemplary embodiment of such deformations is shown in FIG. 9.

Figure 9:
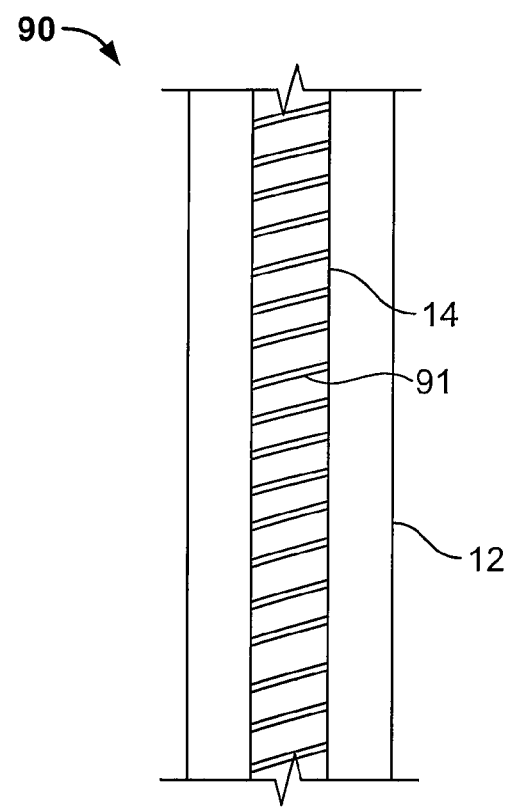

In FIG. 9, nail 90 includes grooves 14 formed along shank 12. Threads 91 are formed within grooves 14. Threads 91 serve to increase the surface area of shank 12, thereby increasing the contact areas between nail 90 and the substrate into which nail 90 is driven. Increasing the contact areas results in a further increase in the withdrawal strength of nail 90. It will be appreciated that any type of deformation formed within grooves that serves to increase the surface area of shank, and that is sufficiently small so as to achieve a high yield strength, may be used, and all such deformations are included within the scope of the present invention.

Figure 2:
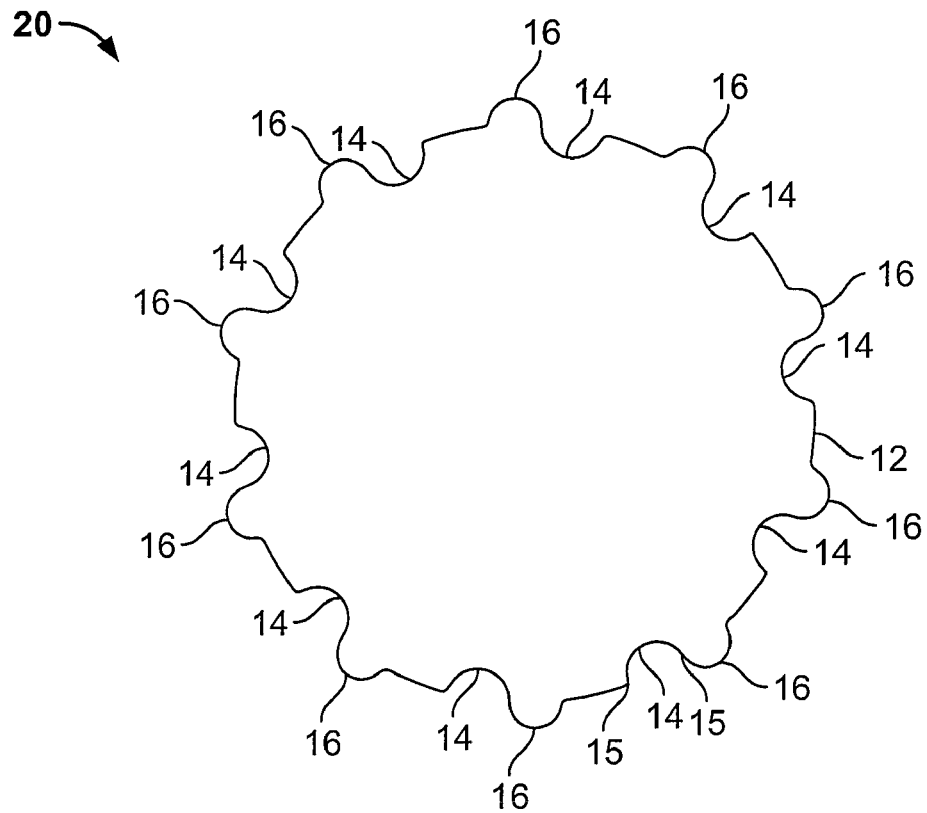
FIG. 2 is a cross-sectional view of the shank of the nail in the second embodiment of the present invention.

As shown in FIG. 2, nail 20 in a second embodiment of the present invention is configured with a similar plurality of grooves 14 as nail 10 of the first embodiment. Grooves 14 are configured to extend along the longitudinal axis of shank 12, from the head to point of nail 20. However, it will be appreciated that in some embodiments of nail 20, grooves 14 may be interrupted and/or may not extend the entire distance from head 11 of to point 13 (as previously discussed with respect to nail 10 of the first embodiment). Grooves 14 preferably are fully semi-circular in shape and are disposed evenly and symmetrically about the circumference of shank 12. However, it will be appreciated that, as in the first embodiment, grooves 14 may be disposed asymmetrically about the circumference of shank 12 for the reasons previously discussed.

Unlike nail 10 of the first embodiment of the present invention, nail 20 includes a plurality of protrusions 16 disposed about the circumference of shank 12 and extending outwardly therefrom. In the preferred embodiment, protrusions 16 are fully semi-circular and are formed integral with one tangent point 15 (two exemplary tangent points 15 are shown in FIG. 2) of each groove 14. Thus, one protrusion 16 is disposed between each groove 14.

In an exemplary embodiment of nail 20, when the diameter of shank 12 of nail 20 is 0.129 inches, a total of ten grooves 14 are disposed about the circumference of shank 12. Each groove 14 has a radius of 0.007 inches and a diameter (width) of 0.014 inches. Grooves 14 are disposed evenly and symmetrically about the circumference of shank 12, and are separated from one another by a distance of 0.0263 inches in the exemplary embodiment. Protrusions 16 have a radius of 0.005 inches and a diameter of 0.010 inches.

Figure 3:
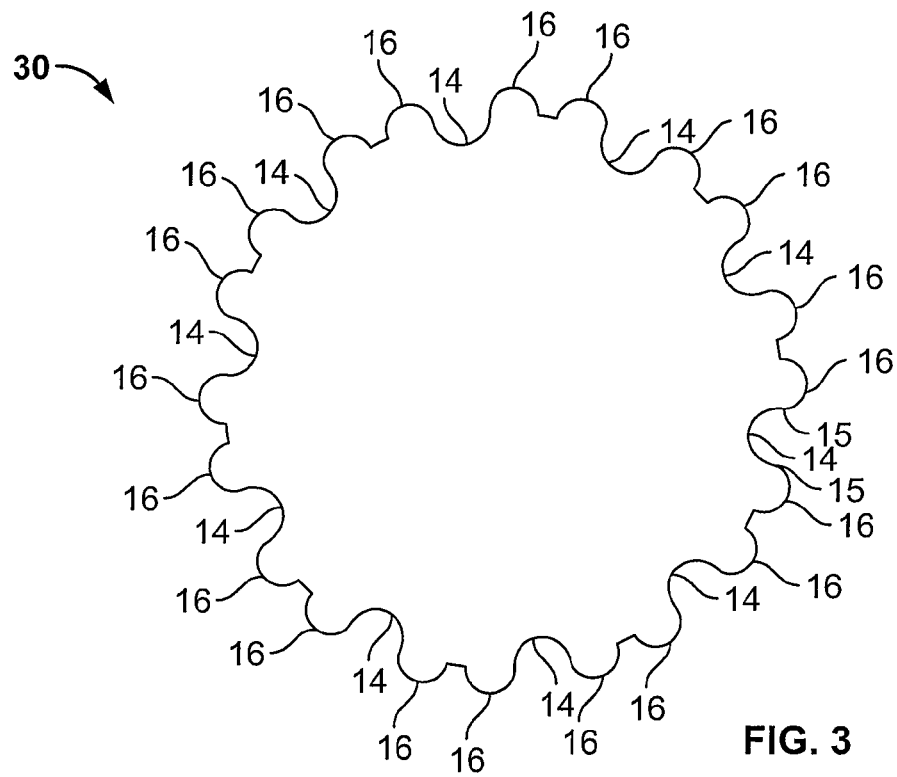
FIG. 3 is a cross-sectional view of the shank of the nail in the third embodiment of the present invention.

As shown in FIG. 3, nail 30 in a third embodiment of the present invention is configured with a similar plurality of grooves 14 as nail 10 of the first embodiment and nail 20 of the second embodiment. Grooves 14 are configured to extend along the longitudinal axis of shank 12, from the head to point of nail 30. However, it will be appreciated that in some embodiments of nail 30, grooves 14 may be interrupted and/or may not extend the entire distance from head 11 of to point 13 (as previously discussed with respect to nail 10). Grooves 14 preferably are fully semi-circular in shape and are disposed evenly and symmetrically about the circumference of shank 12. However, it will be appreciated that, as in the first and second embodiments, grooves 14 may be disposed asymmetrically about the circumference of shank 12 for the reasons previously discussed.

Nail 30 further includes a plurality of protrusions 16 disposed about the circumference of shank 12 and extending outwardly therefrom. In the preferred embodiment, protrusions 16 are fully semi-circular and are formed integral with each tangent point 15 (two exemplary tangent points 15 are shown in FIG. 3) of each groove 14. Thus, two protrusions 16 are disposed between each groove 14.

In an exemplary embodiment of nail 30, when the diameter of shank 12 of nail 30 is 0.129 inches, a total often grooves 14 are disposed about the circumference of shank 12. Each groove 14 has a radius of 0.007 inches and a diameter (width) of 0.014 inches. Grooves 14 are disposed evenly and symmetrically about the circumference of shank 12, and are separated from one another by a distance of 0.0263 inches in the exemplary embodiment. Protrusions 16 have a radius of 0.005 inches and a diameter of 0.010 inches.

Protrusions 16 in nails 20 and 30 in the second and third embodiments of the present invention, respectively, act to further increase the surface area of shank 12 (as compared to nail 10 of the first embodiment of the present invention), thereby additionally increasing the contact areas between nails 20 and 30 and the substrate into which nails 20 and 30 are driven. Increasing the contact areas results in a further increase in the withdrawal strength of nails 20 and 30 as compared to prior art nails.

Formation of protrusions 16 in nails 20 and 30 in the second and third embodiments of the present invention, respectively, also acts to move material outwardly from the shank of nails 20 and 30, thereby increasing the moment of inertia and bending yield strength of the nails 20 and 30.

Additionally, the formation of protrusions 16 in shank 12 of nails 20 and 30 in the second and third embodiments of the present invention, respectively, creates a further work hardening effect at tangent points 15 of grooves 14, further increasing the bending yield strength of nails 20 and 30 as compared to prior art nails.

It is envisioned that the bending yield strength of the nails 20 and 30 may be further increased by increasing the chemistry of the steel used to form the sample nail and/or heat treating the steel during formation of the sample nail.

The two preceding exemplary embodiments of nails 20 and 30 are provided by way of example only, and it will be appreciated that the number of grooves 14, the depth and diameter of grooves 14 and distance between grooves 14 may vary depending upon the diameter of shank 12, the desired material and weight savings and the desired physical characteristics of nails 20 and 30, such as the desired withdrawal strength and bending yield strength.

By way of example only, in the second and third embodiments of the present invention, it is envisioned that the number of grooves 14 may vary from about 5 to about 15 for a nail with a shank diameter of 0.129 inches. Again, it will be appreciated that aforementioned range of number of grooves may vary depending on the particular shank diameter of the nails 20 and 30, and all such ranges are included within the scope of the present disclosure.

It is envisioned that the nails of the present invention may be formed using a variety of techniques common in the manufacture of wire nails, such as using rollers or dies. In one such method, steel wire is passed through a wire forming machine where the wire is drawn or rolled to form the desired shape and diameter, and then coiled. The coiled wire then is taken to nail making machine that cuts the wire, forms the head and forms the point.

To make the nails of the present invention, one such wire forming machine may be equipped with a set of rollers that are formed with protrusions extending outwardly therefrom. The protrusions are configured to engage the wire and, by exerting a compressive force on the wire, to form the desired number, shape and size grooves in the wire as the wire passes through the rollers. In another method, the grooves can also be formed by drawing the wire through a die or like device to cut or move material out of the grooves. The grooved wire is then taken to a nail making machine to form the nails as discussed above.

In some embodiments, the protrusions formed on the rollers may be discontinuous. That is, the protrusions do not extend fully around the circumference of the rollers. In such an embodiment, as the wire passes through the rollers, a length of the wire is not engaged by the protrusions and grooves are not formed on that length. The wire may then be cut by a nail making machine above the non-grooved length and the non-grooved length may be formed into the head of the nail.

In other embodiments, the protrusions formed on the rollers may include means to form deformations in the grooves, as discussed above, as the grooves are being formed. For example, the protrusions may include teeth or other cutting elements configured to form threads, serrations, or other deformations within the grooves.

As set forth above, it has been observed that the grooved configurations provide for ease of driving the fasteners into the substrate. This is particularly significant when cordless tools are used, and even when air (pneumatic) tools are used in that this correlates to less power that is needed to drive the fastener into the substrate. This can perhaps permit the use of smaller tools, or the ability to drive a larger number of fasteners on a single charge for cordless battery powered tools.

The ability to increase holding power and to decrease the power required to drive the fasteners can also be provided by applying a coating to the nails. This can be done in combination with the present grooved fasteners to provide a lighter-weight, lower power to drive, increased holding power nail.

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A nail comprising:
a head;
a point;
a shank extending from the head to the point and having a circumference, an outer diameter, and a longitudinal axis, and defining an outer periphery; and
an odd number of smooth, substantially identical semi-circular grooves formed in the shank and extending straight, longitudinally along the longitudinal axis of the shank, the grooves each defining a nadir, wherein no two nadirs are diametrically opposed to one another such that no two grooves are 180 degrees opposed to one another, wherein the grooves are configured to reduce an amount of material needed to create the nail and provide areas of increased work hardening of the nail at an intersection of the outer periphery and each of the plurality of grooves, and wherein the amount of material needed to create the nail is reduced by about six percent as compared to a non-grooved nail having a shank outer diameter that is the same as the outer diameter of the shank of the nail and the bending yield strength is reduced by about three percent as compared to a non-grooved nail having a shank outer diameter that is the same as the outer diameter of the shank of the nail.

2. The nail in accordance with claim 1 wherein the grooves are evenly spaced about the circumference of the shank.

3. The nail in accordance with the claim 1 wherein the grooves are disposed asymmetrically about the circumference of the shank.

4. The nail in accordance with claim 1 wherein at least one of the grooves extends along the longitudinal axis of the shank between the head of the nail to the point of the nail.

5. The nail in accordance with claim 1 wherein the head is round.

6. The nail in accordance with claim 1 wherein the nail is heat treated.

7. The nail in accordance with claim 1 wherein the amount of material needed to create the nail is reduced by about six percent as compared to a non-grooved nail having a shank outer diameter that is the same as the outer diameter of the shank of the nail.

* * * * *

US007845889C1

(12) EX PARTE REEXAMINATION CERTIFICATE (8502nd)
United States Patent
Shelton et al.

(10) Number: US 7,845,889 C1
(45) Certificate Issued: Aug. 30, 2011

(54) GROOVED FASTENER

(75) Inventors: Lawrence S. Shelton, Morton Grove, IL (US); Henry W. Schniedermeier, Evanston, IL (US)

(73) Assignee: Illinois Tool Works Inc., Glenview, IL (US)

Reexamination Request:
  No. 90/011,669, May 5, 2011

Reexamination Certificate for:
  Patent No.: 7,845,889
  Issued: Dec. 7, 2010
  Appl. No.: 11/958,670
  Filed: Dec. 18, 2007

Related U.S. Application Data

(60) Provisional application No. 60/889,622, filed on Feb. 13, 2007.

(51) Int. Cl.
  *F16B 15/00* (2006.01)

(52) U.S. Cl. ..................... 411/451.4; 411/452
(58) Field of Classification Search ............ 411/451
  See application file for complete search history.

(56) References Cited

FOREIGN PATENT DOCUMENTS

| JP | 15019612 | 12/1940 |
| JP | 50043168 | 8/1973 |
| JP | 08000882 | 5/1996 |

*Primary Examiner* — Sara Clarke

(57) ABSTRACT

A nail having a plurality of grooves configured to reduce the amount of material needed to create the nail and increase the holding power of the nail, while only minimally affecting the bending yield strength of the nail and other important properties. The nail includes a relatively high number of grooves having a relatively shallow depth to retain a cross-sectional geometry of the shank that permits the formation of a full round head of sufficiently large diameter such that pull through resistance of the nail is not significantly affected. Various embodiments of such a nail are disclosed. In a first embodiment, the grooves are semi-circular and are disposed evenly and symmetrically about the circumference of the shank. In a second embodiment, a protrusion is formed at one tangent point (corner) of each of the plurality of grooves. In a third embodiment, a protrusion is formed at each tangent point of each of the plurality of grooves. In other embodiments the grooves may be unevenly and asymmetrically disposed about the circumference of the shank, the grooves may comprise non-semi-circular geometries and the grooves may comprise deformations.

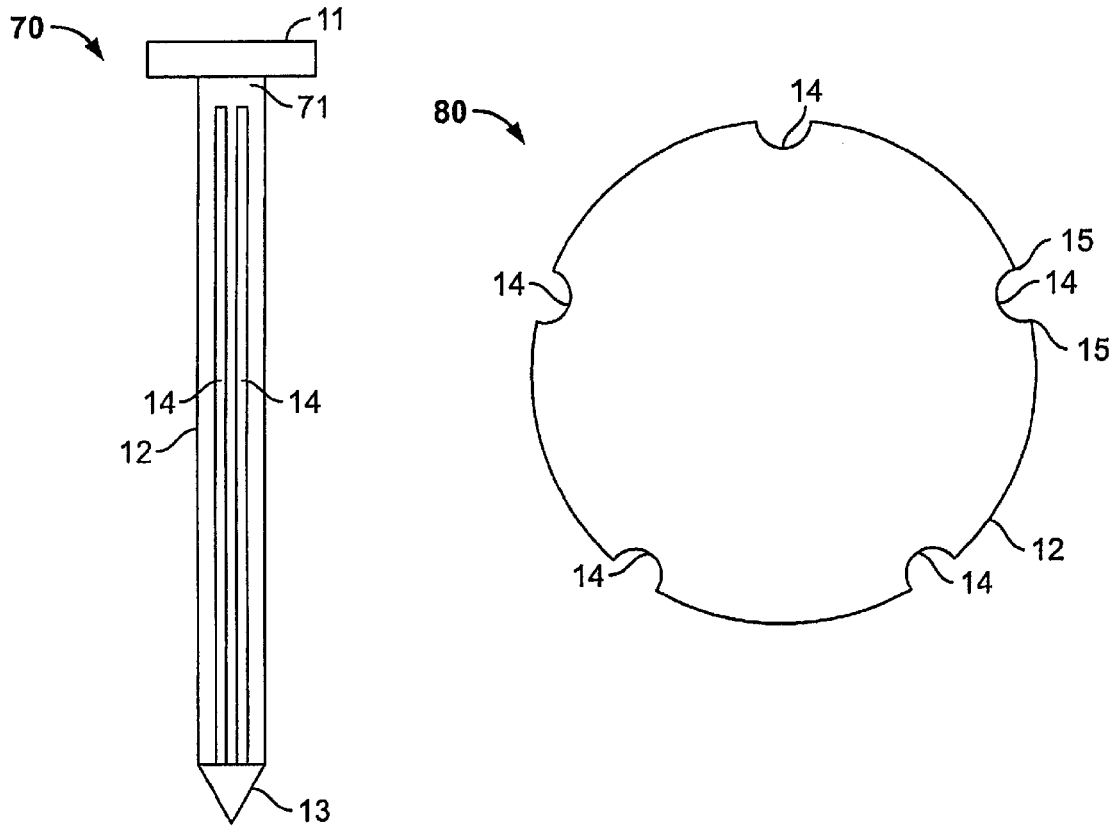

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *